United States Patent
Wang et al.

(10) Patent No.: US 11,811,066 B2
(45) Date of Patent: Nov. 7, 2023

(54) COMPOSITIONS AND METHODS FOR DRY ELECTRODE FILMS INCLUDING MICROPARTICULATE NON-FIBRILLIZABLE BINDERS

(71) Applicant: Tesla, Inc., Austin, TX (US)

(72) Inventors: Ziying Wang, San Diego, CA (US); Hieu Minh Duong, Rosemead, CA (US); Yudi Yudi, Alameda, CA (US); Joon Ho Shin, San Diego, CA (US); Prince Magsino, San Diego, CA (US)

(73) Assignee: TESLA, INC., Austin, TX (US)

( * ) Notice: Subject to any disclaimer, the term of this patent is extended or adjusted under 35 U.S.C. 154(b) by 0 days.

(21) Appl. No.: 18/054,838

(22) Filed: Nov. 11, 2022

(65) Prior Publication Data

US 2023/0075404 A1    Mar. 9, 2023

Related U.S. Application Data

(62) Division of application No. 16/366,220, filed on Mar. 27, 2019, now Pat. No. 11,545,666.

(60) Provisional application No. 62/650,903, filed on Mar. 30, 2018.

(51) Int. Cl.
| | |
|---|---|
| *H01M 4/62* | (2006.01) |
| *H01M 10/0525* | (2010.01) |
| *H01M 4/04* | (2006.01) |
| *H01M 4/1393* | (2010.01) |
| *H01M 4/583* | (2010.01) |
| *C08L 1/28* | (2006.01) |
| *C08L 27/16* | (2006.01) |
| *C08L 27/18* | (2006.01) |

(52) U.S. Cl.
CPC ......... *H01M 4/623* (2013.01); *H01M 4/0404* (2013.01); *H01M 4/0435* (2013.01); *H01M 4/1393* (2013.01); *H01M 4/583* (2013.01); *H01M 4/622* (2013.01); *H01M 10/0525* (2013.01); *C08L 1/286* (2013.01); *C08L 27/16* (2013.01); *C08L 27/18* (2013.01); *C08L 2203/20* (2013.01); *Y02E 60/10* (2013.01)

(58) Field of Classification Search
CPC ...... C08L 1/286; C08L 2203/20; C08L 27/16; C08L 27/18; H01M 10/0525; H01M 4/0404; H01M 4/0435; H01M 4/1393; H01M 4/583; H01M 4/622; H01M 4/623; Y02E 60/10

See application file for complete search history.

(56) References Cited

U.S. PATENT DOCUMENTS

| | | |
|---|---|---|
| 7,935,155 B2 | 5/2011 | Mitchell et al. |
| 9,525,168 B2 | 12/2016 | Mitchell et al. |
| 11,545,666 B2 | 1/2023 | Wang et al. |

(Continued)

*Primary Examiner* — Lingwen R Zeng
(74) *Attorney, Agent, or Firm* — KNOBBE, MARTENS, OLSON & BEAR, LLP

(57) ABSTRACT

Provided herein are dry process electrode films, and energy storage devices incorporating the same, including a microparticulate non-fibrillizable binder having certain particle sizes. The electrode films exhibit improved mechanical and processing characteristics. Also provided are methods for processing such microparticulate non-fibrillizable electrode film binders, and for incorporating the microparticulate non-fibrillizable binders in electrode films.

22 Claims, 7 Drawing Sheets
(5 of 7 Drawing Sheet(s) Filed in Color)

(56) References Cited

U.S. PATENT DOCUMENTS

| | | |
|---|---|---|
| 2005/0266298 A1 | 12/2005 | Mitchell et al. |
| 2006/0114643 A1 | 6/2006 | Mitchell et al. |
| 2006/0133013 A1 | 6/2006 | Xi et al. |
| 2012/0034505 A1 | 2/2012 | Zhu |
| 2014/0030590 A1* | 1/2014 | Wang .................... H01M 4/366 977/734 |
| 2014/0098464 A1 | 4/2014 | Bendale et al. |
| 2015/0303481 A1* | 10/2015 | Duong .................... H01G 9/15 241/5 |
| 2019/0131626 A1 | 5/2019 | Wang et al. |

* cited by examiner

COMPOSITIONS AND METHODS FOR DRY ELECTRODE FILMS INCLUDING MICROPARTICULATE NON-FIBRILLIZABLE BINDERS

INCORPORATION BY REFERENCE TO ANY PRIORITY APPLICATIONS

Any and all applications for which a foreign or domestic priority claim is identified in the Application Data Sheet as filed with the present application are hereby incorporated by reference in their entirety under 37 CFR 1.57. This application claims the benefit of U.S. patent application Ser. No. 16/366,220, filed Mar. 27, 2019, which claims the benefit of U.S. Provisional Patent Application No. 62/650,903, filed Mar. 30, 2018, entitled "COMPOSITIONS AND METHODS FOR DRY ELECTRODE FILMS INCLUDING MICROPARTICULATE NON-FIBRILLIZABLE BINDERS", the entirety of each of which are hereby incorporated by reference for all purposes.

BACKGROUND

Field

The present invention relates generally to energy storage devices, and specifically to materials and methods for dry electrode films including microparticulate non-fibrillizable binders.

Description of the Related Art

Electrical energy storage cells are widely used to provide power to electronic, electromechanical, electrochemical, and other useful devices. Such cells include batteries such as primary chemical cells and secondary (rechargeable) cells, fuel cells, and various species of capacitors, including ultracapacitors. Increasing the operating power and energy of energy storage devices, including capacitors and batteries, would be desirable for enhancing energy storage, increasing power capability, and broadening real-world use cases.

Energy storage devices including electrode films combining complimentary attributes may increase energy storage device performance in real-world applications. Furthermore, existing dry and solvent-free methods of fabrication may impose a practical limit to the composition of an electrode. Thus, new electrode film formulations, and methods for their fabrication, may result in expanded possibilities for electrode film formulation, and consequently in improved performance.

SUMMARY

For purposes of summarizing the invention and the advantages achieved over the prior art, certain objects and advantages of the invention are described herein. Not all such objects or advantages may be achieved in any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

In a first aspect, a self-supporting dry electrode film including a microparticulate, non-fibrillizable binder having particle sizes of about 0.5 µm to about 40 µm is provided.

In a second aspect, a dry electrode film of an energy storage device is provided. The dry electrode film includes a dry active material and a dry binder comprising a fibrillizable binder and a microparticulate non-fibrillizable binder having a $D_{50}$ particle size of about 0.5-40 µm, and wherein the dry electrode film is free-standing.

In some embodiments, the microparticulate non-fibrillizable binder has a $D_{50}$ particle size of about 1-25 µm. In some embodiments, the dry binder comprises up to 50 wt. % of the microparticulate non-fibrillizable binder.

In some embodiments, the microparticulate non-fibrillizable binder is selected from at least one of cellulose and a cellulose derivative. In some embodiments, the microparticulate non-fibrillizable binder is selected from at least one of cellulose, a cellulose ester, a cellulose ether, cellulose nitrate, a carboxyalkylcellulose, a cellulose salt and a cellulose salt derivative. In some embodiments, the microparticulate non-fibrillizable binder is selected from at least one of cellulose, cellulose acetate, methylcellulose, ethylcellulose, hydroxylpropylcellulose (HPC), hydroxyethylcellulose (HEC), cellulose nitrate, carboxymethylcellulose (CMC), carboxyethylcellulose, carboxypropylcellulose, carboxyisopropylcellulose, sodium cellulose, sodium cellulose nitrate and sodium carboxyalkylcellulose. In some embodiments, the microparticulate non-fibrillizable binder is selected from at least one of carboxymethylcellulose (CMC) and polyvinylidene fluoride (PVDF). In some embodiments, the cellulose or the cellulose derivative has a number average molecular weight of about 10,000 to about 500,000. In some embodiments, the cellulose derivative has a degree of substitution of about 0.7 to about 1.5.

In some embodiments, the fibrillizable binder comprises polytetrafluoroethylene (PTFE). In some embodiments, the dry electrode film is substantially free of holes, cracks and surface pits. In some embodiments, the dry electrode film has a tensile strength of at least about 1 N. In some embodiments, the dry active material comprises graphite.

In a third aspect, an electrode comprising the dry electrode film in contact with a current collector is provided. In a fourth aspect, a lithium ion battery comprising the electrode is provided.

In a fifth aspect, a method of fabricating a dry electrode film of an energy storage device is provided. The method includes processing a dry non-fibrillizable binder at high shear to form a dry microparticulate non-fibrillizable binder, combining a dry fibrillizable binder with the dry microparticulate non-fibrillizable binder to form a dry electrode film mixture, and calendering the dry electrode film mixture to form a free-standing dry electrode film.

In a sixth aspect, a method of fabricating a dry electrode film of an energy storage device is provided. The method includes providing a dry microparticulate non-fibrillizable binder, mixing the dry microparticulate non-fibrillizable binder with a dry first active material by a first nondestructive mixing process to form a dry bulk active material mixture, mixing a dry fibrillizable binder with a second dry active material by a high shear mixing process to form a dry structural binder mixture, mixing the dry bulk active material mixture and the dry structural binder mixture by a second nondestructive mixing process to form a dry electrode film mixture, and producing a free standing dry electrode film from the dry electrode film mixture.

In some embodiments, the method further comprises processing a dry non-fibrillizable binder at high shear to form the dry microparticulate non-fibrillizable binder.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
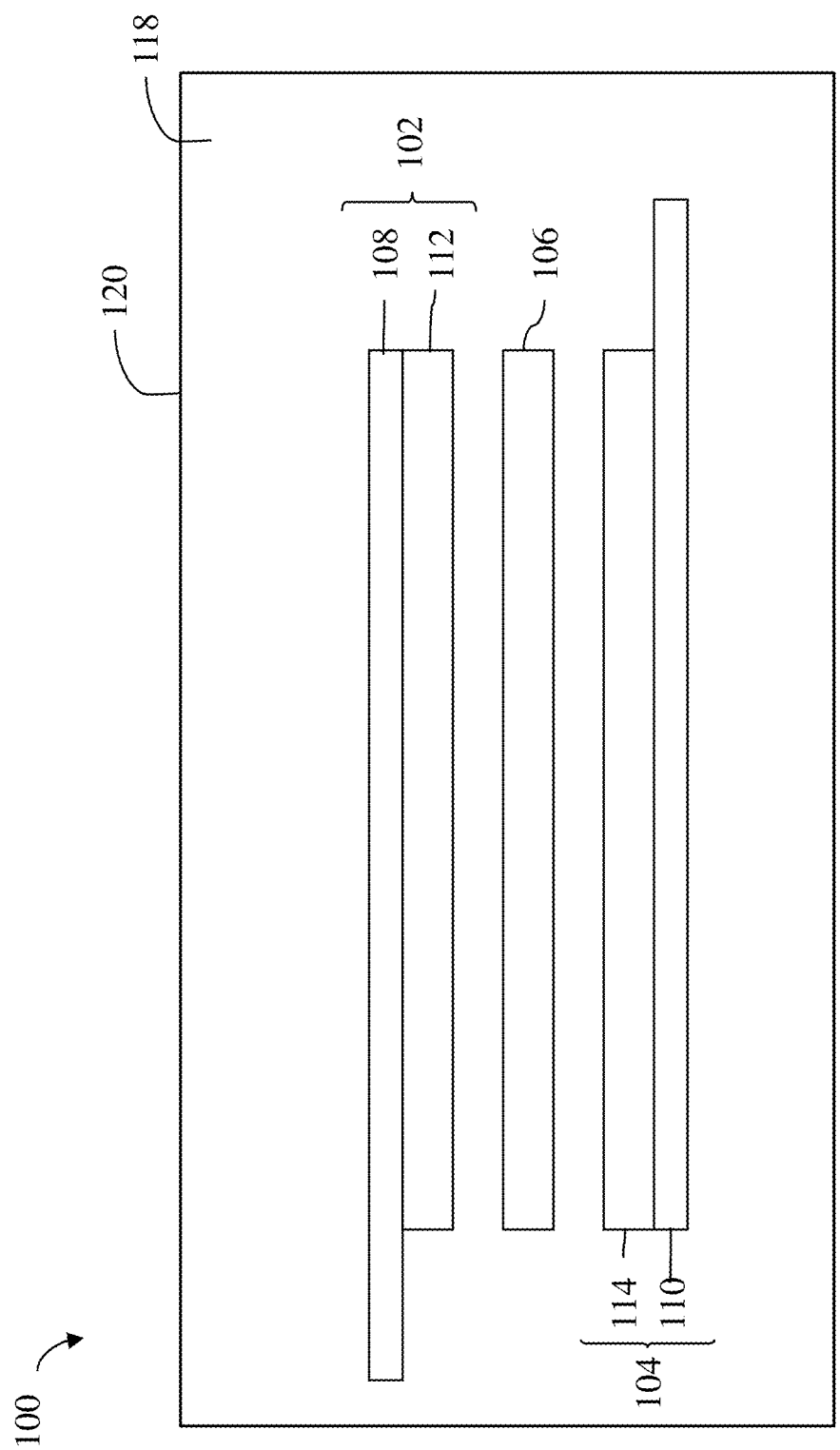
FIG. 1 depicts an embodiment of an energy storage device.

Provided herein are various embodiments of electrode films for use in energy storage devices. In particular, in certain embodiments, energy storage devices disclosed herein include electrode films including a microparticulate non-fibrillizable binder having certain particle sizes. The electrode films were discovered to exhibit improved mechanical and processing characteristics. Also provided are methods for processing such microparticulate non-fibrillizable electrode film binders, and for incorporating the microparticulate non-fibrillizable binders into electrode films. The present disclosure reveals that increased uniformity of distribution of materials in electrode films can be realized when the particle sizes of certain components are within the ranges provided herein.

Lithium ion batteries have been relied on as a power source in numerous commercial and industrial uses, for example, in consumer devices, productivity devices, and in battery-powered vehicles. However, demands placed on energy storage devices are continuously—and rapidly—growing. For example, the automotive industry is developing vehicles that rely on compact and efficient energy storage, such as plug-in hybrid vehicles and pure electric vehicles.

Some components that affect the storage potential of an energy storage device include the electrodes, and more specifically, the electrode films comprising each electrode in the device. The electrochemical capabilities of electrodes, for example, the capacity and efficiency of battery electrodes, is governed by various factors. For example, distribution of active material, binder and additive(s); the physical properties of materials therein, such as particle size and surface area of active material; the surface properties of the active materials; and the physical characteristics of the electrode film, such as cohesiveness, and adhesiveness to a conductive element. Dry processing methods traditionally used a high shear and/or high-pressure processing step to break up and commingle electrode film materials, which may contribute to structural advantages over electrode films produced using a wet process.

In principle, electrode films having a more uniform distribution of active materials, binders, and other components will exhibit higher performance. Generally, it is thought that electrode films may suffer reduced performance due to the mechanical properties of the film components, and interactions therebetween. For example, it is thought that mechanical limitations may result from poor adhesion between an active layer and a current collector, and poor cohesion in the electrode film, for example, between active materials and binders. Such processes may lead to losses in performance in both power delivery and energy storage capacity. It is thought that losses in performance may be due to deactivation of active materials, for example, due to losses in ionic conductivity, in electrical conductivity, or a combination thereof. For example, as adhesion between active layers and current collectors decreases, cell resistance may increase. Decreases in cohesion between active materials may also lead to increases in cell resistance, and in some cases electrical contact may be lost, removing some active material from the ionic and electrical transfer cycles in the cell. Without wishing to be limited by theory, it is thought that volumetric changes in the active materials may contribute to such processes. For example, additional degradation may be observed in electrodes incorporating certain active materials, such as silicon-based materials, that undergo significant volumetric changes during cell cycling. Lithium intercalation-deintercalation processes may correspond to such volumetric changes in some systems. Generally, these mechanical degradation processes may be observed in any electrode, for example a cathode, an anode, a positive electrode, a negative electrode, a battery electrode, a capacitor electrode, a hybrid electrode, or other energy storage device electrode. It is anticipated that increasing uniformity of electrode film materials will mitigate at least some of these problems.

More specifically, uniform distribution of binders in an electrode film may provide a film with improved mechanical characteristics. Such an improvement may provide a number of practical benefits. For example, an electrode film having a uniform distribution of binder components may exhibit reduced incidence of defects and/or reduced severity of defects, compared to an electrode film having poorer distribution of binder materials. For further example, an electrode film having a uniform distribution of binder components may exhibit higher tensile strength and/or ductility, which may facilitate the manufacture of an energy storage device. Specifically, electrode films having higher tensile strength and/or ductility may be easier to apply to a current collector or other substrate. These factors can be especially relevant when dry electrode processing techniques are used, as the electrode film may be handled as a free-standing film, defined further herein as a "self-supporting film."

Smaller particle sizes may in principle allow for more uniform distribution of electrode film materials including active materials, binders, and other components. However, in practice, some components may aggregate when reduced below a certain size threshold. Thus, the particle sizes of various components of the electrode film may be advantageously incorporated within ranges. In the present disclosure, it was discovered that microparticulate non-fibrillizable binders may be incorporated in electrode films at certain particle sizes. Smaller particle sizes and more intimate contact of active materials, binders, and additives may be realized, leading to a better device. Smaller particle sizes may permit the more consistent manufacture of electrode films. These electrode films may be made with a reduced variation in properties between electrode films manufactured using substantially identical processes, and/or under substantially identical conditions.

When an electrode film is produced by a dry, solvent-free process, water dispersion is not available, and uniform dispersion of the cellulose may be more difficult to achieve. Commercially available CMC in powder form is generally limited to $D_{50}$ particle size of approximately 40-70 µm. More specific sizes within this range are limited to certain degrees of substitution. It is thought that the larger particle size fraction presents various problems such as dispersion inhomogeneity of CMC, localized pressure during calender rolling, adhesion of CMC particles to heated calender rollers, which may lead to problems described herein such as electrode film defects. It is thought that reduction of cellulose particle size to be commensurate with active material particles may ameliorate the problems described herein. As the CMC is better dispersed and on the order of the particle size of active material particles, calendar pressure is thought to be more uniformly distributed throughout the electrode film, which may lead to more consistency and less damage to the active material particles, such as graphite particles. Additionally, the improvement in consistency on film formation may enable the production of a uniform continuous roll film.

Some embodiments include electrode films made by a dry process for use in batteries, where the electrode films include a microparticulate non-fibrillizable binder having a particle size in the range of 0.5 to 40 µm, and at least one fibrillizable binder. Embodiments include dry electrodes and fabrication processes that provide microparticulate non-fibrillizable binder particles having the sizes in the range of about 0.5 to about 40 µm, and electrode film incorporating such microparticulate non-fibrillizable binder particles. Such electrode films may have a more uniform distribution of active materials, binders, and other components. Electrode films incorporating such microparticulate non-fibrillizable binder particles may exhibit improved tensile strength and/or processability. In certain embodiments, the microparticulate non-fibrillizable binder is a cellulose, for example, carboxymethylcellulose (CMC). The electrode film may be suitable for use as an anode of a lithium ion battery. In certain embodiments, the electrode film includes graphite.

A dry or self-supporting electrode film incorporating such microparticulate non-fibrillizable binder particles may provide improved characteristics relative to a typical electrode film. For example, a dry or self-supporting electrode film may provide one or more of improved film strength, improved cohesiveness, improved adhesiveness, improved electrical performance, or reduced incidence of defects. The defects may include holes, cracks, surface pits in the electrode film. The adhesiveness may be adhesiveness to a current collector. The electrical performance may be specific capacity. The film strength may be tensile strength.

An electrode film described herein, or an energy storage device incorporating an electrode film described herein, may advantageously be characterized by improved specific capacity (which may be measured in mAh/g). Further improvements that may be realized in various embodiments include reduced capacity fade over the life of the device.

Some embodiments relate to dry electrode processing techniques. Dry electrode fabrication processes may be as disclosed in one or more of U.S. Publication No. 2006/0114643, U.S. Publication No. 2006/0133013, U.S. Pat. No. 9,525,168, or U.S. Pat. No. 7,935,155, each of which is incorporated by reference herein in the entirety.

Further provided herein are methods for reducing the particles sizes of microparticulate non-fibrillizable binders. A pressurized jet milling process was found to reduce the particle size of the microparticulate non-fibrillizable binder. For example, a non-fibrillizable binder can be placed into a jet mill and "jet milled" to reduce the particle size to be on the order of the median ($D_{50}$) particle size of the active material(s) to be included in the electrode film. In some embodiments, the active material may be graphite having a median particle size of about 15 µm. In further embodiments, the microparticulate non-fibrillizable binder can be a cellulose, for example, CMC. Suitable pressurized jet milling conditions include a grind gas pressure of 100-500 psi. The jet milling may include separation of milled particles by particle size. For example, particles of the microparticulate non-fibrillizable binder having a given size can be separated by a classifier.

Figure 6:
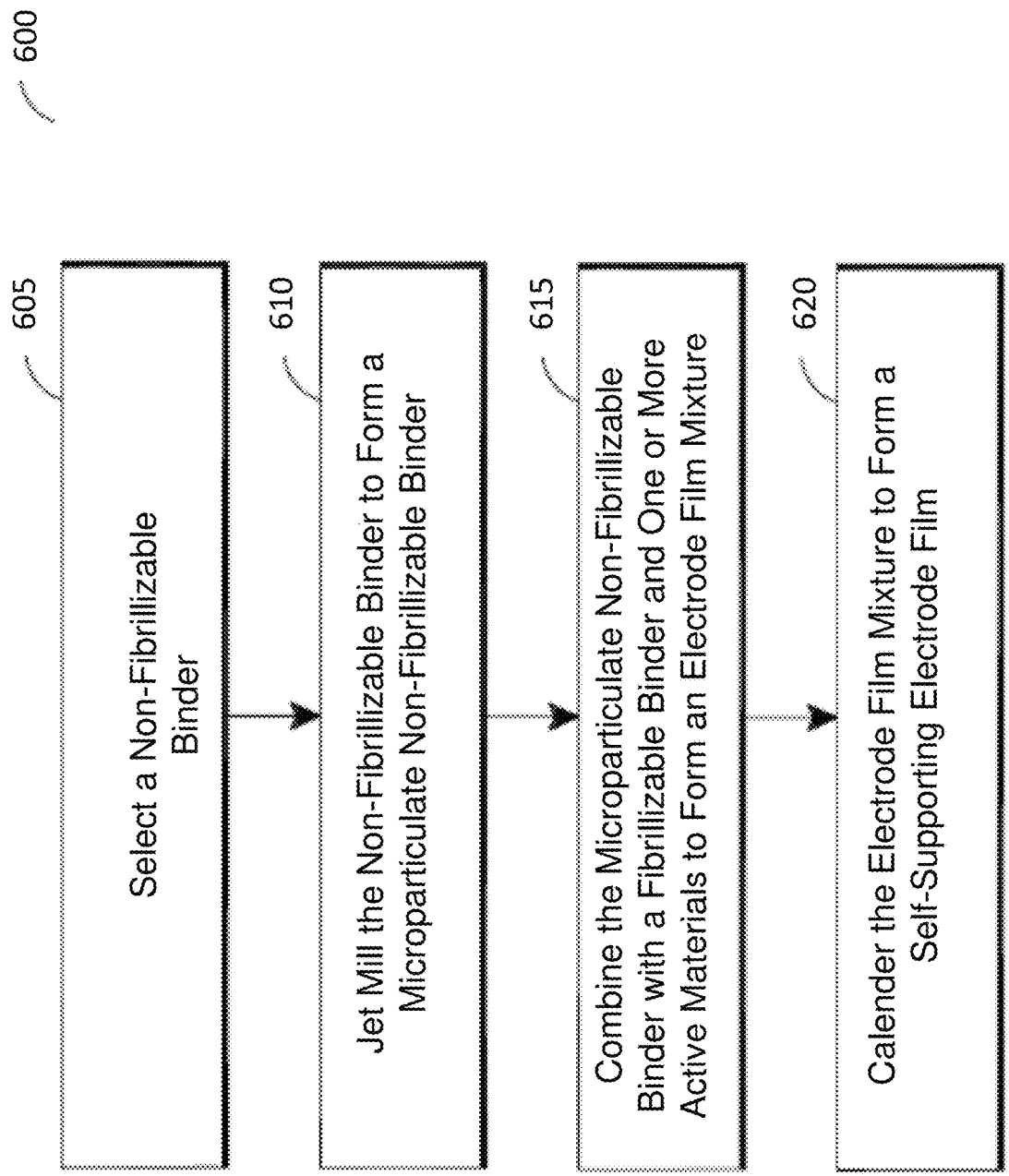
FIG. 6 provides a flow chart depicting a method for fabricating a free-standing electrode film by combining non-fibrillizable binder with fibrillizable binder.

One embodiment is a method of fabricating a free-standing electrode film. With reference to FIG. 6, the method 600 may include selecting a non-fibrillizable binder (605); jet-milling the non-fibrillizable binder to form a microparticulate non-fibrillizable binder having a median particle size (610). Step 610 may comprise milling the non-fibrillizable binder to result in particles on the order of the active material particle size, which may be, for example, about 0.5 to about 40 µm; combining the microparticulate non-fibrillizable binder particles with a fibrillizable binder and one or more active materials to form an electrode film mixture (615); and calendering the electrode film mixture to form a self-supporting and/or free-standing electrode film (620). In some embodiments, each step is dry and solvent-free. In some embodiments, the microparticulate non-fibrillizable binder is polyvinylidene fluoride (PVDF) and/or CMC. In further embodiments, the microparticulate non-fibrillizable binder is CMC. In still further embodiments, the fibrillizable binder is PTFE. In yet further embodiments, the active material comprises graphite. A method of fabricating a free-standing electrode film may comprise one or more parallel processing steps as provided in FIG. 7.

Figure 7:
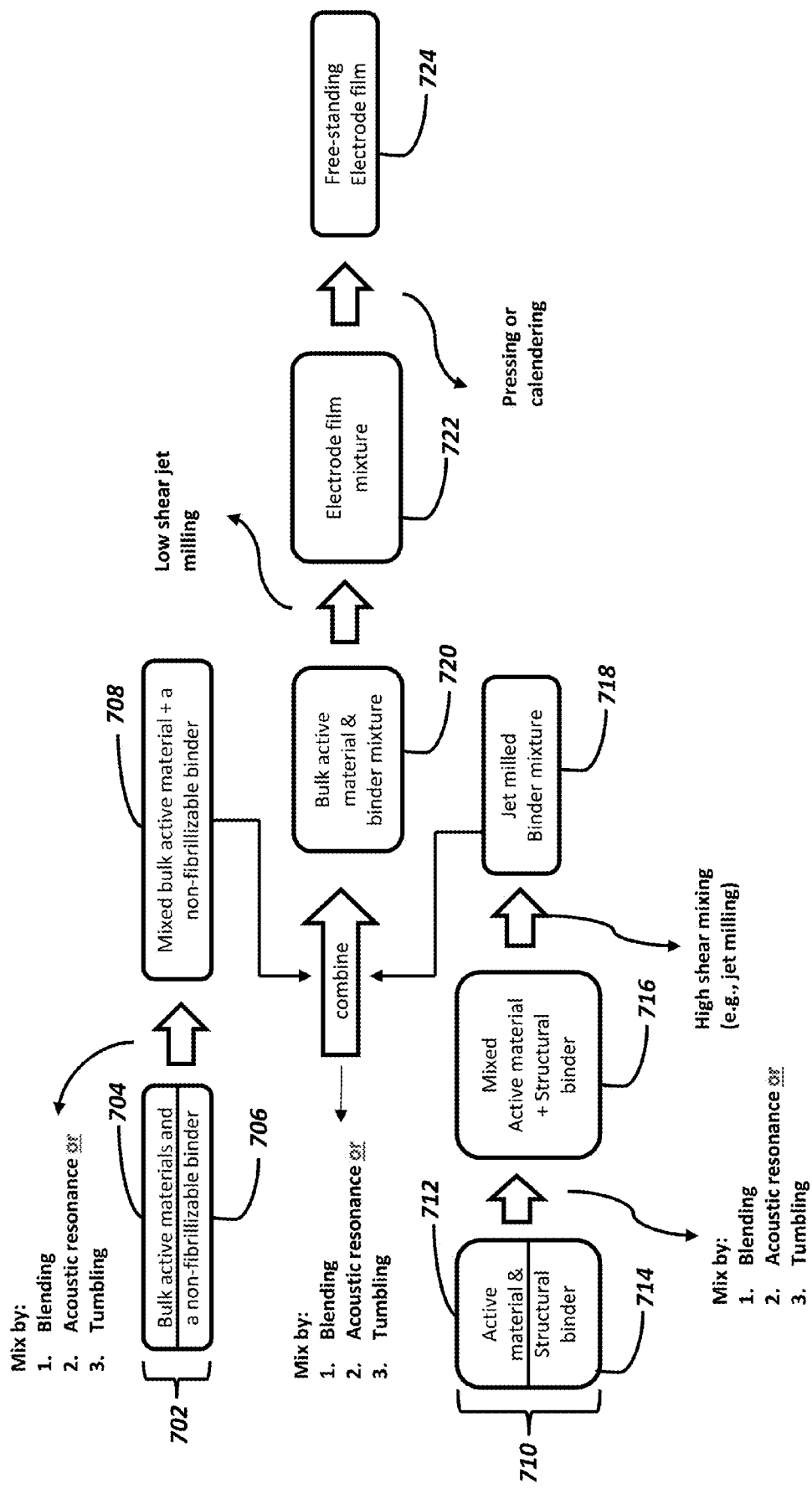
FIG. 7 provides a flow chart depicting a method for parallel processing of electrode film binders.

With reference to FIG. 7, the parallel processing method begins with an upper (as shown) parallel processing path 702 and a lower (as shown) parallel processing path 710. In the upper (as shown) parallel processing path 702, a bulk active material mixture 708 is formed by nondestructively mixing a bulk active material 704 with a non-fibrillizable binder 706. The non-fibrillizable binder 706 may be a microparticulate non-fibrillizable binder, as described previously herein. The non-fibrillizable binder 704 may be, for example, PVDF and/or CMC. The bulk active material 706 may be graphite. In the lower (as shown) parallel processing path 710, a second active material 712 and a structural binder 714 are combined under nondestructive mixing. The structural binder 714 may be PTFE, and the second active material 712 may be graphite. The mixed structural binder and second active material form an initial binder mixture 716 that is then jet-milled in a high shear, high intensity process to form a structural binder mixture 718. The bulk active material mixture 708 is then combined with the structural binder mixture 718 in a nondestructive mixing process to form a bulk active material and binder mixture 720, which is then processed by a low shear jet milling to form an electrode film mixture 722. The low shear jet milling may be performed at a high feed rate, for example, relative to the initial jet milling used to form the structural binder mixture 718. The electrode film mixture 722 may then be pressed or calendered into a self-supporting and free-standing electrode film 724. Generally, no solvents are required in any stage of the process.

In various embodiments, a dry powder, for example, a mixture including binder particles and active material particles, can be mixed by a mild process using, for example a convection, pneumatic or diffusion mixer as follows: a tumbler with and without mixing media (for example, glass bead, ceramic ball), a paddle mixer, a blade blender or an acoustic mixer. The mild mixing process may be nondestructive with respect to any active materials in the mixture. Without limitation, graphite particles may be preserved of size following the mild mixing process. In further embodiments, the powder mixing sequence and conditions can be varied to improve uniform distribution of active material, binder, and optional additive(s).

The materials and methods provided herein can be implemented in various energy storage devices. As provided herein, an energy storage device can be a capacitor, a lithium ion capacitor (LIC), an ultracapacitor, a battery, a lithium ion battery, or a hybrid energy storage device combining aspects of two or more of the foregoing. In preferable embodiments, the device is a lithium ion battery.

An energy storage device can be of any suitable configuration, for example planar, spirally wound, button shaped, or pouch. An energy storage device can be a component of a system, for example, a power generation system, an uninterruptible power source systems (UPS), a photo voltaic power generation system, an energy recovery system for use in, for example, industrial machinery and/or transportation. An energy storage device may be used to power various electronic device and/or motor vehicles, including hybrid electric vehicles (HEV), plug-in hybrid electric vehicles (PHEV), and/or electric vehicles (EV).

FIG. 1 shows a side cross-sectional schematic view of an example of an energy storage device 100 having an electrode film including a microparticulate non-fibrillizable binder as provided herein. The energy storage device 100 may be classified as, for example, a capacitor, a battery, a capacitor-battery hybrid, or a fuel cell. In one embodiment, device 100 is a lithium ion battery.

The device has a first electrode 102, a second electrode 104, and a separator 106 positioned between the first electrode 102 and second electrode 104. The first electrode 102 and the second electrode 104 are adjacent to respective opposing surfaces of the separator 106. The energy storage device 100 includes an electrolyte 118 to facilitate ionic communication between the electrodes 102, 104 of the energy storage device 100. For example, the electrolyte 118 may be in contact with the first electrode 102, the second electrode 104 and the separator 106. The electrolyte 118, the first electrode 102, the second electrode 104, and the separator 106 are housed within an energy storage device housing 120. One or both of the first electrode 102 and the second electrode 104 may comprise a microparticulate non-fibrillizable binder as described herein.

One or more of the first electrode 102, the second electrode 104, and the separator 106, or constituent thereof, may comprise porous material. The pores within the porous material can provide containment for and/or increased surface area for contact with an electrolyte 118 within the housing 120. The energy storage device housing 120 may be sealed around the first electrode 102, the second electrode 104 and the separator 106, and may be physically sealed from the surrounding environment.

In some embodiments, the first electrode 102 can be an anode (a "negative electrode") and the second electrode 104 can be a cathode (a "positive electrode"). The separator 106 can be configured to electrically insulate two electrodes adjacent to opposing sides of the separator 106, such as the first electrode 102 and the second electrode 104, while permitting ionic communication between the two adjacent electrodes. The separator 106 can comprise a suitable porous, electrically insulating material. In some embodiments, the separator 106 can comprise a polymeric material. For example, the separator 106 can comprise a cellulosic material (e.g., paper), a polyethylene (PE) material, a polypropylene (PP) material, and/or a polyethylene and polypropylene material.

Generally, the first electrode 102 and second electrode 104 each comprise a current collector and an electrode film. Electrodes 102 and 104 comprise electrode films 112 and 114, respectively. Electrode films 112 and 114 can have any suitable shape, size and thickness. For example, the electrode films can have a thickness of about 30 microns (μm) to about 250 microns, for example, about 50 microns, about 100 microns, about 150 microns, about 200 microns, about 250 microns, about 300 microns, about 400 microns, about 500 microns, about 750 microns, about 1000 microns, about 2000 microns, or values therebetween. The electrode films generally comprise one or more active materials, for example, anode active materials or cathode active materials as provided herein. The electrode films 112 and/or 114 may be dry and/or self-supporting electrode films as provided herein, and having advantageous properties, such as tensile strength, or capacity, as provided herein. The first electrode film 112 and/or the second electrode film 114 may also include a microparticulate non-fibrillizable binder as described herein, and may also include one or more additional binders. The electrode films 112 and/or 114 may be prepared by a process as described herein. The electrode films 112 and/or 114 may be wet or self-supporting dry electrodes as described herein.

As shown in FIG. 1, the first electrode 102 and the second electrode 104 include a first current collector 108 in contact with first electrode film 112, and a second current collector 110 in contact with the second electrode film 114, respectively. The first current collector 108 and the second current collector 110 facilitate electrical coupling between each corresponding electrode film and an external electrical circuit (not shown). The first current collector 108 and/or the second current collector 110 comprise one or more electrically conductive materials, and have can have any suitable shape and size selected to facilitate transfer of electrical charge between the corresponding electrode and an external circuit. For example, a current collector can include a metallic material, such as a material comprising aluminum, nickel, copper, rhenium, niobium, tantalum, and noble metals such as silver, gold, platinum, palladium, rhodium, osmium, iridium and alloys and combinations of the foregoing. For example, the first current collector 108 and/or the second current collector 110 can comprise, for example, an aluminum foil or a copper foil. The first current collector 108 and/or the second current collector 110 can have a rectangular or substantially rectangular shape sized to provide transfer of electrical charge between the corresponding electrode and an external circuit.

In some embodiments, the at least one active material includes a treated carbon material, where the treated carbon material includes a reduction in a number of hydrogen-containing functional groups, nitrogen-containing functional groups and/or oxygen-containing functional groups, as described in U.S. Patent Publication No. 2014/0098464. For example, the treated carbon particles can include a reduction in a number of one or more functional groups on one or more surfaces of the treated carbon, for example about 10% to about 60% reduction in one or more functional groups compared to an untreated carbon surface, including about 20% to about 50%. The treated carbon can include a reduced number of hydrogen-containing functional groups, nitrogen-containing functional groups, and/or oxygen-containing functional groups. In some embodiments, the treated carbon material comprises functional groups less than about 1% of which contain hydrogen, including less than about 0.5%. In some embodiments, the treated carbon material comprises functional groups less than about 0.5% of which contains nitrogen, including less than about 0.1%. In some embodiments, the treated carbon material comprises functional groups less than about 5% of which contains oxygen, including less than about 3%. In further embodiments, the treated carbon material comprises about 30% fewer hydrogen-containing functional groups than an untreated carbon material.

In some embodiments, energy storage device 100 can be a lithium ion battery. In some embodiments, the electrode film of a lithium ion battery electrode can comprise a microparticulate non-fibrillizable binder as described herein, one or more active materials, and a fibrillized binder matrix.

In further embodiments, the energy storage device 100 is charged with a suitable lithium-containing electrolyte. For example, device 100 can include a lithium salt, and a solvent, such as a non-aqueous or organic solvent. Generally, the lithium salt includes an anion that is redox stable. In some embodiments, the anion can be monovalent. In some embodiments, a lithium salt can be selected from hexafluorophosphate ($LiPF_6$), lithium tetrafluoroborate ($LiBF_4$), lithium perchlorate ($LiClO_4$), lithium bis(trifluoromethansulfonyl)imide ($LiN(SO_2CF_3)_2$), lithium trifluoromethansulfonate ($LiSO_3CF_3$), and combinations thereof. In some embodiments, the electrolyte can include a quaternary ammonium cation and an anion selected from the group consisting of hexafluorophosphate, tetrafluoroborate and iodide. In some embodiments, the salt concentration can be about 0.1 mol/L (M) to about 5 M, about 0.2 M to about 3 M, or about 0.3 M to about 2 M. In further embodiments, the salt concentration of the electrolyte can be about 0.7 M to about 1 M. In certain embodiments, the salt concentration of the electrolyte can be about 0.2 M, about 0.3 M, about 0.4 M, about 0.5 M, about 0.6 M, about 0.7 M, about 0.8 M, about 0.9 M, about 1 M, about 1.1 M, about 1.2 M, or values therebetween.

In some embodiments the energy storage device electrolyte can include a liquid solvent. The solvent need not dissolve every component, and need not completely dissolve any component, of the electrolyte. In further embodiments, the solvent can be an organic solvent. In some embodiments, a solvent can include one or more functional groups selected from carbonates, ethers and/or esters. In some embodiments, the solvent can comprise a carbonate. In further embodiments, the carbonate can be selected from cyclic carbonates such as, for example, ethylene carbonate (EC), propylene carbonate (PC), vinyl ethylene carbonate (VEC), vinylene carbonate (VC), fluoroethylene carbonate (FEC), and combinations thereof, or acyclic carbonates such as, for example, dimethyl carbonate (DMC), diethyl carbonate (DEC), ethyl methyl carbonate (EMC), and combinations thereof. In certain embodiments, the electrolyte can comprise $LiPF_6$, and one or more carbonates.

In some embodiments, the lithium ion battery is configured to operate at about 2.5 to 4.5 V, or 3.0 to 4.2 V. In further embodiments, the lithium ion battery is configured to have a minimum operating voltage of about 2.5 V to about 3 V, respectively. In still further embodiments, the lithium ion battery is configured to have a maximum operating voltage of about 4.1 V to about 4.4 V, respectively.

Definitions

As used herein, the terms "battery" and "capacitor" are to be given their ordinary and customary meanings to a person of ordinary skill in the art. The terms "battery" and "capacitor" are nonexclusive of each other. A capacitor or battery can refer to a single electrochemical cell that may be operated alone, or operated as a component of a multi-cell system.

As used herein, the voltage of an energy storage device is the operating voltage for a single battery or capacitor cell. Voltage may exceed the rated voltage or be below the rated voltage under load, or according to manufacturing tolerances.

As provided herein, a "self-supporting" electrode film is an electrode film that incorporates binder matrix structures sufficient to support the film or layer and maintain its shape such that the electrode film or layer can be free-standing. When incorporated in an energy storage device, a self-supporting electrode film or active layer is one that incorporates such binder matrix structures. Generally, and depending on the methods employed, such electrode films are strong enough to be employed in energy storage device fabrication processes without any outside supporting elements, such as a current collector or other film. For example, a "self-supporting" electrode film can have sufficient strength to be rolled, handled, and unrolled within an electrode fabrication process without other supporting elements. A dry electrode film described herein, such as a cathode electrode film or an anode electrode film, may be self-supporting.

As provided herein, a "solvent-free" electrode film is an electrode film that contains no detectable processing solvents, processing solvent residues, or processing solvent impurities. A dry electrode film described herein, such as a cathode electrode film or an anode electrode film, may be solvent-free.

A "wet" electrode, "wet process" electrode, or slurry electrode as provided herein, is an electrode prepared by at least one step involving a slurry of active material(s), binder(s), and optionally additive(s). A wet electrode generally will include a detectable amount of processing solvent residues, and/or processing solvent impurities, even after the electrode is dried, due to the solvents used during processing.

As used herein, a "nondestructive" process is a process in which an electrode active material, including the surface of the electrode active material, is not substantially modified during the process. Thus, the analytical characteristics and/or performance in an application, such as incorporation in an energy storage device, of the active material, are identical or nearly identical to those which have not undergone the process. For example, a coating on the active material may be undisturbed or substantially undisturbed during the process. A non-limiting example of a nondestructive process is "nondestructively mixing or blending," or jet milling at a reduced pressure, increased feed rate, decreased velocity (e.g., blender speed), and/or change in other process parameter(s) such that the shear imparted upon an active material remains below a threshold at which the analytical characteristics and/or performance of the active material would be adversely affected, when implemented into an energy storage device. A "nondestructive" process can be distinguished from a high shear process which substantially modifies an electrode active material, such as the surface of an electrode active material, and substantially affects the analytical characteristics and/or the performance of the active material. For example, high shear blending or jet milling can have detrimental effects on the surface of an electrode active material. A high shear process may be implemented, at the detriment to the active material surface characteristics, to provide other benefits, such as fibrillization of binder material, or otherwise forming a binder/active material matrix to assist in forming a self-supporting electrode film. Embodiments herein provide similar benefits, while avoiding the detrimental effects of excessive use of high shear processes. In general, the nondestructive processes herein are performed at one or more of a higher feed rate, lower velocity, and/or lower pressure, resulting in a lower shear process than the more destructive processes that will otherwise substantially modify an electrode active material, and thus affect performance.

In some embodiments, an electrode film as provided herein includes at least one active material and at least one binder. The at least one active material can be any active material known in the art. The at least one active material may be a material suitable for use in the anode or cathode of a battery. Anode active materials can be comprised of, for example, an insertion material (such as carbon, graphite, and/or graphene), an alloying/dealloying material (such as silicon, silicon oxide, tin, and/or tin oxide), a metal alloy or compound (such as Si—Al, and/or Si—Sn), and/or a conversion material (such as manganese oxide, molybdenum oxide, nickel oxide, and/or copper oxide). The anode active materials can be used alone or mixed together to form multi-phase materials (such as Si—C, Sn—C, SiOx-C, SnOx-C, Si—Sn, Si-SiOx, Sn-SnOx, Si-SiOx-C, Sn-SnOx-C, Si—Sn—C, SiOx-SnOx-C, Si-SiOx-Sn, or Sn-SiOx-SnOx.). The cathode active material can be, for example, a metal oxide, metal sulfide, or a lithium metal oxide. The lithium metal oxide can be, for example, a lithium nickel manganese cobalt oxide (NMC), a lithium manganese oxide (LMO), a lithium iron phosphate (LFP), a lithium cobalt oxide (LCO), a lithium titanate (LTO), and/or a lithium nickel cobalt aluminum oxide (NCA). In some embodiments, cathode active materials can be comprised of, for example, a layered transition metal oxide (such as $LiCoO_2$ (LCO), $Li(NiMnCo)O_2$ (NMC) and/or $LiNi_{0.8}Co_{0.15}Al_{0.05}O_2$ (NCA)), a spinel manganese oxide (such as $LiMn_2O_4$ (LMO) and/or $LiMn_{1.5}Ni_{0.5}O_4$ (LMNO)) or an olivine (such as $LiFePO_4$).

The at least one active material may include one or more carbon materials. The carbon materials may be selected from, for example, graphitic material, graphite, graphene-containing materials, hard carbon, soft carbon, carbon nanotubes, porous carbon, conductive carbon, or a combination thereof. A graphite can be synthetic or naturally derived. Activated carbon can be derived from a steam process or an acid/etching process. In some embodiments, the graphitic material can be a surface treated material. In some embodiments, the porous carbon can comprise activated carbon. In some embodiments, the porous carbon can comprise hierarchically structured carbon. In some embodiments, the porous carbon can include structured carbon nanotubes, structured carbon nanowires and/or structured carbon nanosheets. In some embodiments, the porous carbon can include graphene sheets. In some embodiments, the porous carbon can be a surface treated carbon.

In some embodiments, a cathode electrode film of a lithium ion battery or hybrid energy storage device can include about 70 weight % to about 98 weight % of the at least one active material, including about 70 weight % to about 92 weight %, or about 70 weight % to about 96 weight %. In some embodiments, the cathode electrode film can comprise up to about 10 weight % of the porous carbon material, including up to about 5 weight %, or about 1 weight % to about 5 weight %. In some embodiments, the cathode electrode film comprises up to about 5 weight %, including about 1 weight % to about 3 weight %, of the conductive additive. In some embodiments, the cathode electrode film comprises up to about 20 weight % of binder, for example, about 1.5 weight % to 10 weight %, about 1.5 weight % to 5 weight %, or about 1.5 weight % to 3 weight %. In some embodiments, the cathode electrode film comprises about 1.5 weight % to about 3 weight % binder.

In some embodiments, an anode electrode film may comprise at least one active material, a binder, and optionally a conductive additive. In some embodiments, the conductive additive may comprise a conductive carbon additive, such as carbon black. In some embodiments, the at least one active material of the anode may comprise synthetic graphite, natural graphite, hard carbon, soft carbon, graphene, mesoporous carbon, silicon, silicon oxides, tin, tin oxides, germanium, lithium titanate, mixtures, or composites of the aforementioned materials. In some embodiments, an anode electrode film can include about 80 weight % to about 98 weight % of the at least one active material, including about 80 weight % to about 98 weight %, or about 94 weight % to about 97 weight %. In some embodiments, the anode electrode film comprises up to about 5 weight %, including about 1 weight % to about 3 weight %, of the conductive additive. In some embodiments, the anode electrode film comprises up to about 20 weight % of the binder, including about 1.5 weight % to 10 weight %, about 1.5 weight % to 5 weight %, or about 3 weight % to 5 weight %. In some embodiments, the anode electrode film comprises about 4 weight % binder. In some embodiments, the anode film may not include a conductive additive.

Some embodiments include an electrode film, such as of an anode and/or a cathode, having one or more binders. The one or more binders include a microparticulate non-fibrillizable binder having a particle size in the range of 0.5 μm to 40 μm as described herein, and in some embodiments, along with a fibrillizable binder. The microparticulate non-fibrillizable binder may be cellulose or a derivative of cellulose. A derivative of cellulose can include, for example, cellulose esters such as cellulose acetate; cellulose ethers such as methylcellulose, ethylcellulose, hydroxylpropylcellulose (HPC), or hydroxyethylcellulose (HEC); cellulose nitrate; or a carboxyalkylcellulose, for example, carboxymethylcellulose (CMC), carboxyethylcellulose, carboxypropylcellulose, or carboxyisopropylcellulose. In further embodiments, the cellulose or cellulose derivative may comprise a cellulose salt. In still further embodiments, a cellulose salt cation may be selected from sodium, ammonium, or lithium. For example, the cellulose or cellulose derivative may comprise a sodium cellulose or a sodium cellulose derivative selected from a sodium cellulose ester, sodium cellulose ether, a sodium cellulose nitrate, or a sodium carboxyalkylcellulose. In preferable embodiments, the microparticulate non-fibrillizable binder is CMC. The CMC may comprise sodium carboxymethylcellulose.

A cellulose derivative may be characterized by its degree of substitution. For example, the degree of substitution may be about 0.7 to about 1.5, or about 1.2. Certain degrees of substitution may be desirable, when the material is implemented within an electrode film, in order to provide desirable characteristics. However, commercially available CMC in powder form was found to be limited to certain particle sizes and degrees of substitution. For example, commercially available CMC powders having a degree of substitution of 1.2 were found to be available only in larger particles sizes. Smaller particle sizes down to about 40 μm were found to be limited to a degree of substitution of 0.7, which was observed to be an unfavorable degree of substitution. As mentioned above, smaller CMC powder has not been available, as there has been no recognized need for such material, and certainly not at a desirable degree of substitution.

In some embodiments, the cellulose or cellulose derivative may include crosslinks. Further, a cellulose or cellulose derivative may be characterized by its molecular weight, which generally is number average molecular weight. In some embodiments, the cellulose or cellulose derivative has a number average molecular weight of about 10,000 to about 500,000, or about 50,000 to about 400,000.

The one or more binders can include polytetrafluoroethylene (PTFE), a polyolefin, polyalkylenes, polyethers, styrene-butadiene, co-polymers of polysiloxanes and polysiloxane, branched polyethers, polyvinylethers, co-polymers thereof, and/or admixtures thereof. The binder can include a cellulose. The cellulose can be a carboxyalkylcellulose, for example, carboxymethylcellulose (CMC). In some embodiments, the polyolefin can include polyethylene (PE), polypropylene (PP), polyvinylidene fluoride (PVDF), co-polymers thereof, and/or mixtures thereof. For example, the binder can include polyvinylene chloride, poly(phenylene oxide) (PPO), polyethylene-block-poly(ethylene glycol), poly(ethylene oxide) (PEO), poly(phenylene oxide) (PPO), polyethylene-block-poly(ethylene glycol), polydimethylsiloxane (PDMS), polydimethylsiloxane-coalkylmethylsiloxane, co-polymers thereof, and/or admixtures thereof. In certain embodiments, the fibrillizable binder is PTFE. A dry self-supporting electrode film may comprise interpenetrating networks of the aforementioned binders. In some embodiments, the one or more binders comprise CMC, PVDF, and PTFE.

The binder may include various suitable ratios of the polymeric components. The microparticulate non-fibrillizable binder can be up to 50 weight % of the binder. For example, the microparticulate non-fibrillizable binder can be about 0.1 weight % to about 50 weight %, about 0.5 weight % to about 10 weight %, about 0.5 weight % to about 5 weight %, about 0.5 to about 2 weight %, or about 0.5 to about 1 weight %. PTFE can be up to about 98 weight % of the binder, for example, from about 20 weight % to about 95 weight %, about 20 weight % to about 90 weight %, including about 20 weight % to about 80 weight %, about 30 weight % to about 70 weight %, about 30 weight % to about 50 weight %, or about 50 weight % to about 90 weight %. In some embodiments, the one or more binders comprises about 0.1 to about 2 weight % CMC, about 0.1 to about 2 weight % PVDF, and about 1 to about 4 weight % PTFE. In certain embodiments, the one or more binders comprises about 1 weight % CMC, about 1 weight % PVDF, and about 2 weight % PTFE.

In some embodiments, the microparticulate non-fibrillizable binder particles may have a median particle size of about 0.5 μm to about 40 μm, for example, about 1 μm to about 25 μm, about 2 μm to about 20 μm, about 5 μm to about 15 μm, or about 10 μm to about 15 μm. The electrode film mixture may additionally include binder particles other than the microparticulate non-fibrillizable binder particles, for example, PTFE binder particles, having selected sizes. In some embodiments, the binder particles may be about 50 nm, about 100 nm, about 150 nm, about 200 nm, about 250 nm, about 300 nm, about 350 nm, about 400 nm, about 450 nm, about 500 nm, about 1 μm, about 2 μm, about 3 μm, about 4 μm, about 5 μm, about 10 μm, about 50 μm, about 100 μm, or values therebetween.

A dry fabrication process can refer to a process in which no or substantially no solvents are used in the formation of an electrode film. For example, components of the electrode film, including active materials and binders, may comprise dry particles. The dry particles for forming the electrode film may be combined to provide a dry particle electrode film mixture. In some embodiments, the electrode film may be formed from the dry particle electrode film mixture such that weight percentages of the components of the electrode film and weight percentages of the components of the dry particles electrode film mixture are substantially the same. In some embodiments, the electrode film formed from the dry particle electrode film mixture using the dry fabrication process may be free from, or substantially free from, any processing additives such as solvents and solvent residues resulting therefrom. In some embodiments, the resulting electrode films are self-supporting films formed using the dry process from the dry particle mixture. In some embodiments, the resulting electrode films are free-standing films formed using the dry process from the dry particle electrode film mixture. A process for forming an active layer or electrode film can include fibrillizing the fibrillizable binder component(s) such that the film comprises a fibrillized binder matrix. In further embodiments, a free-standing electrode film may be formed in the absence of a current collector. In still further embodiments, an electrode film may comprise a fibrillized polymer matrix such that the film is self-supporting. It is thought that a matrix, lattice, or web of fibrils can be formed to provide mechanical structure to the electrode film.

In some embodiments, an energy storage device electrode film, wherein the electrode film is dry and/or self-supporting film including a microparticulate non-fibrillizable binder described herein, may provide a specific capacity on charge or discharge of about 300 mAh/g, about 325 mAh/g, about 350 mAh/g, about 375 mAh/g, about 400 mAh/g, about 425 mAh/g, about 450 mAh/g, about 500 mAh/g, or a range of values therebetween. In further embodiments, an energy storage device electrode film, wherein the electrode film is dry and/or self-supporting film including a microparticulate non-fibrillizable binder described herein, may provide a first cycle efficiency of about 90%, about 91%, about 92%, about 93%, or a range of values therebetween.

An electrode film may have a selected thickness suitable for certain applications. The thickness of an electrode film as provided herein may be greater than that of an electrode film prepared by conventional processes. In some embodiments, the electrode film can have a thickness of about 250 microns, about 300 microns, about 350 microns, about 400 microns, about 450 microns, about 500 microns, about 750 microns, about 1 mm, or about 2 mm, or a range of values therebetween.

In some embodiments, a free-standing and/or self-supporting electrode film including a microparticulate non-fibrillizable binder described herein may have a tensile strength of at least about 1 N. In further embodiments, the tensile strength may be about 1 N, about 1.1 N, about 1.2 N, about 1.3 N, about 1.4 N, about 1.5 N, about 1.6 N, about 1.7 N, about 1.8 N, about 1.9 N, about 2 N, greater than about 2 N, or a range of values therebetween.

In some embodiments, a set (of, e.g., at least 3 electrode films) of free-standing and/or self-supporting electrode films including a microparticulate non-fibrillizable binder described herein fabricated under substantially identical conditions may have variation in specific capacity of less than about 3% standard deviation (sd), for example, about 2.5% sd, about 2% sd, about 1.5% sd, about 1% sd, about 0.5% sd, or a range of values therebetween.

In some embodiments, a free-standing and/or self-supporting electrode film including a microparticulate non-fibrillizable binder described herein may be characterized by a specific energy density 20-30% higher than a wet battery electrode of comparable constitution, e.g., of active materials.

In specific examples below, electrode films including a microparticulate non-fibrillizable binder were fabricated.

EXAMPLE 1

Dry battery anode electrode films were fabricated, which included 96% by weight graphite and 4% by weight binder, wherein the binder included 2% PTFE, 1% CMC and 1% PVDF. Other electrode film compositions can be envisioned and prepared, and the disclosure herein is not limited to the specific compositions disclosed.

Figures 2A, 2B:
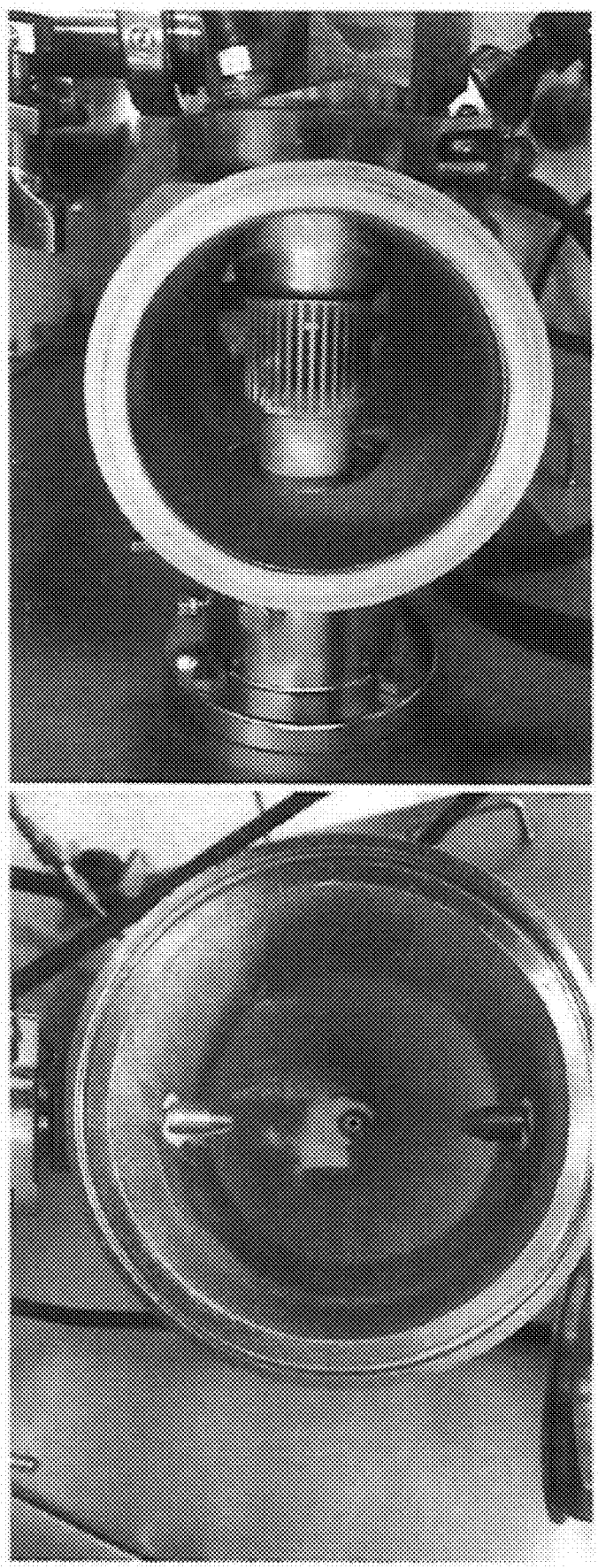
FIG. 2A is a photograph of the inside of a grind chamber of a jet mill with three jets pointing at the same point.
FIG. 2B is an image of a classifier with a spinning wheel that selects an output size of particles.
Figure 3B:
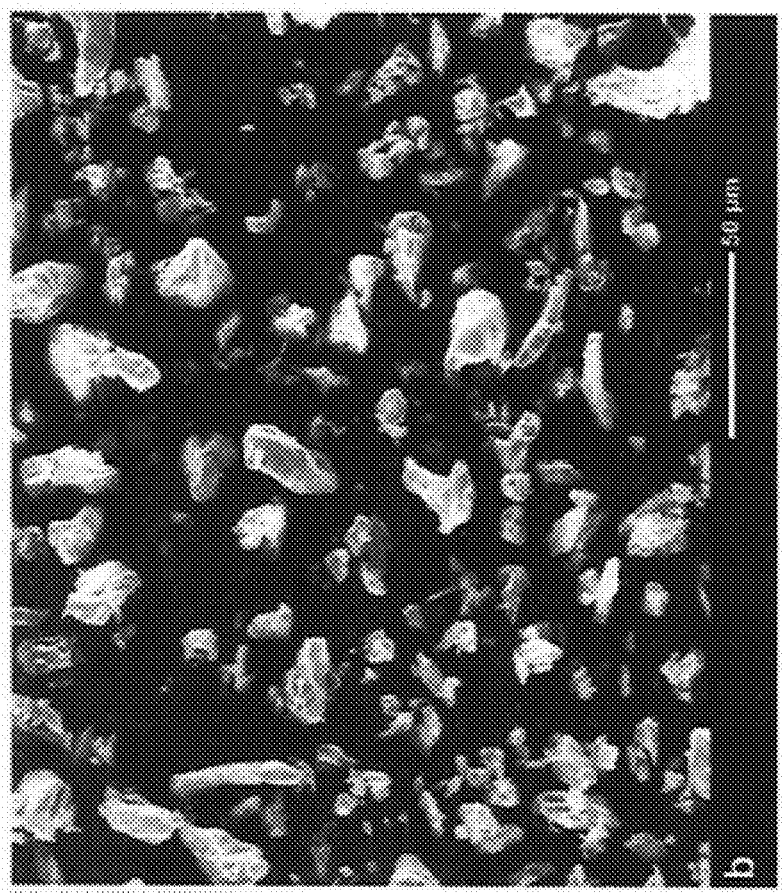
FIG. 3B depicts jet-milled CMC particles that have been treated according to Example 1.
Figure 3A:
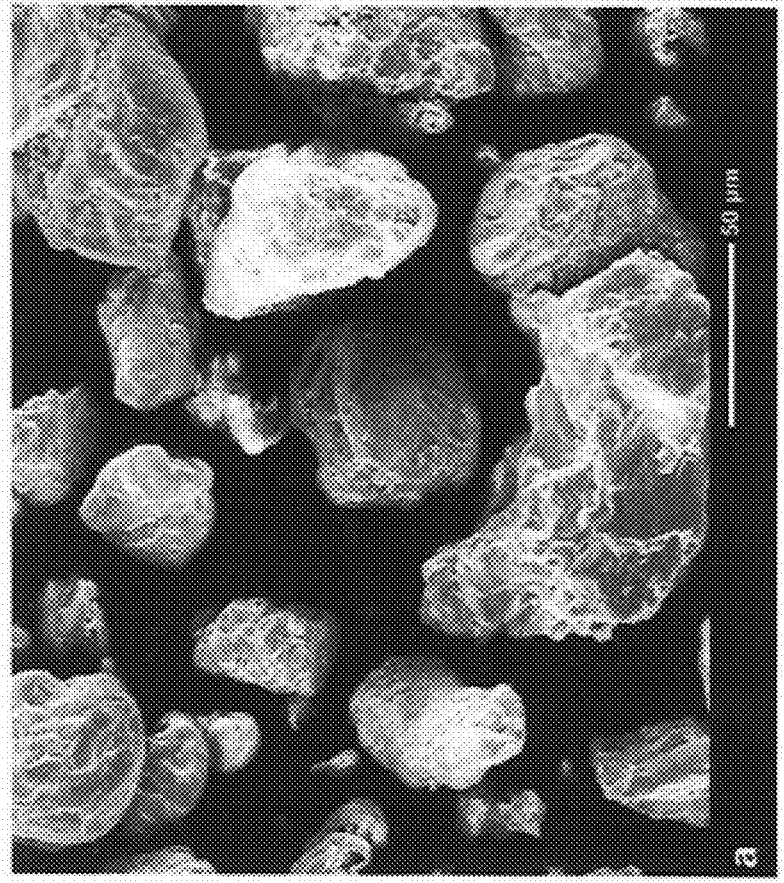
FIG. 3A depicts an SEM image of commercially available CMC particles.
Figure 4:
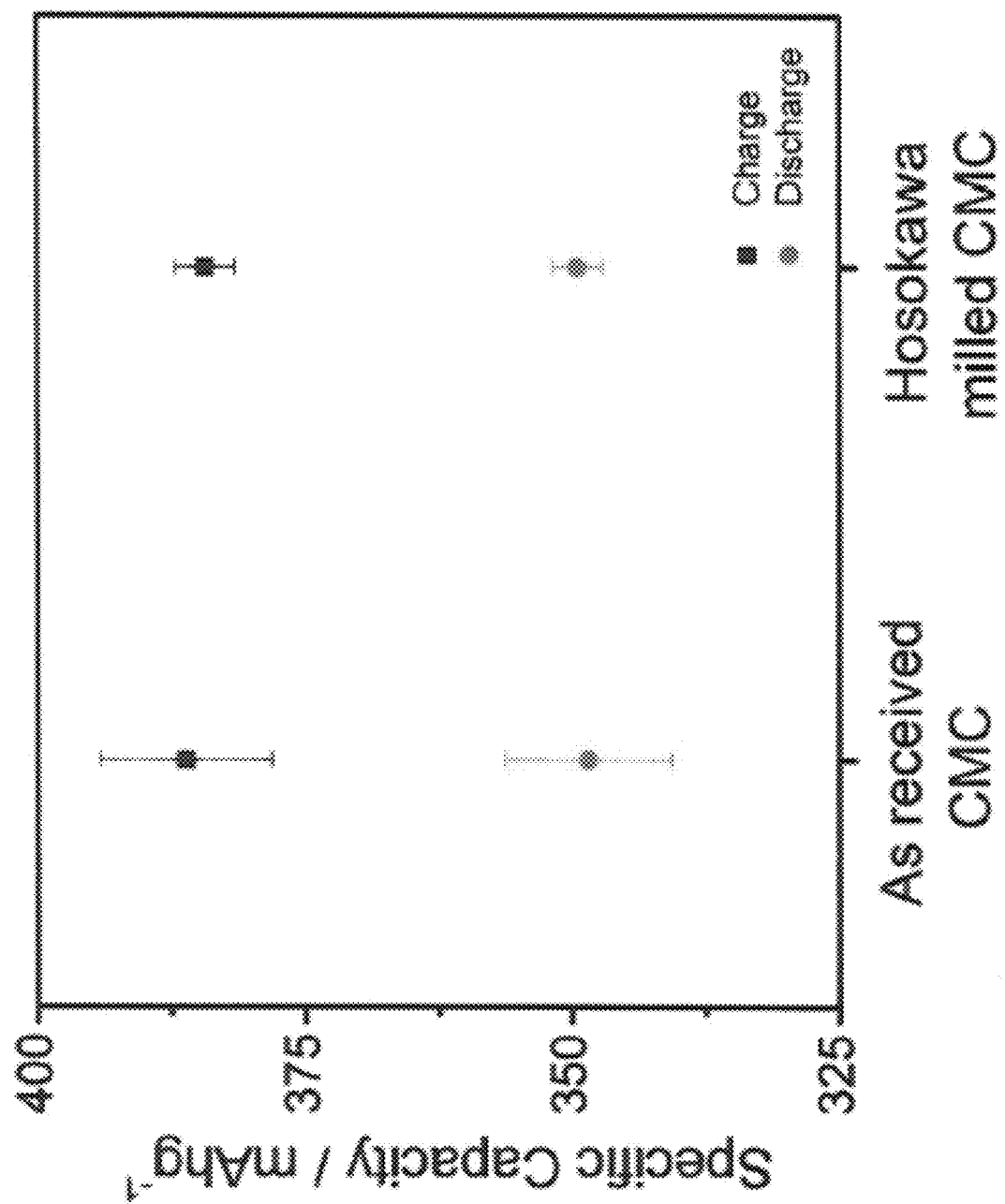
FIG. 4 provides a chart providing charge and discharge specific capacities for dry graphite anodes fabricated according to Example 1, and compare anodes fabricated with commercially available CMC and milled CMC.

Using a Hosokawa 100 AFG pressurized jet mill with a classifier attachment, as received CMC powders were milled with a size output selection. Sigma Aldrich® sodium carboxymethylcellulose with a degree of substitution of 1.2 was used as the feed material. A classifier rotation speed of 8000 rpm was used in order to size select for a $D_{50}$ of 10 μm. Grind gas pressure was 120 psi with an initial chamber mass of 100 g. This resulted in a production rate of approximately 0.1 kg/hr. Pictures of the 100 AFG machine can be seen in FIGS. 2A and 2B. As received CMC powder from Sigma Aldrich® had a $D_{50}$ particle size of approximately 70 μm while the Hosokawa milled CMC had a $D_{50}$ of approximately 10 μm. This difference can be seen in SEM images in FIGS. 3A and 3B. When Hosokawa milled CMC was used in a dry anode electrode parallel process, an increase in first cycle efficiency and cell to cell consistency was observed compared to as received CMC. Electrochemical data for this comparison is shown in FIG. 4. Using as received CMC, a charge and discharge specific capacity of 386 mAh/g and 348 mAh/g respectively (90.2% efficiency) were achieved. Using milled CMC, a charge and discharge specific capacity of 384 mAh/g and 349 mAh/g respectively (90.9% efficiency) were achieved.

Figure 5B:
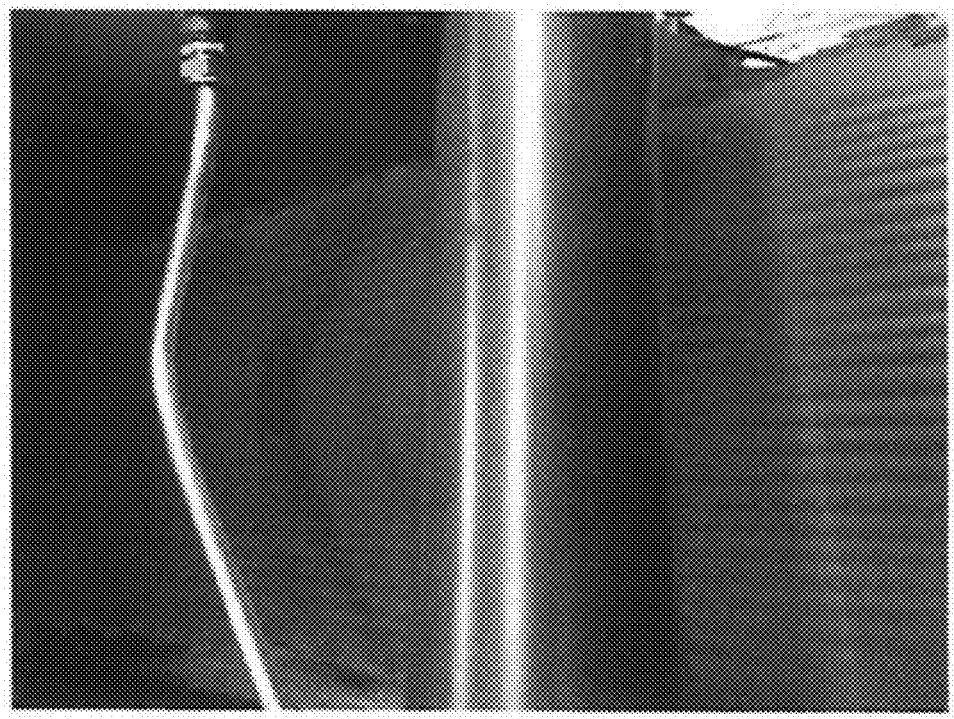
FIG. 5B depicts an image of an anode film prepared with jet milled CMC particles according to the treatment of Example 1.
Figure 5A:
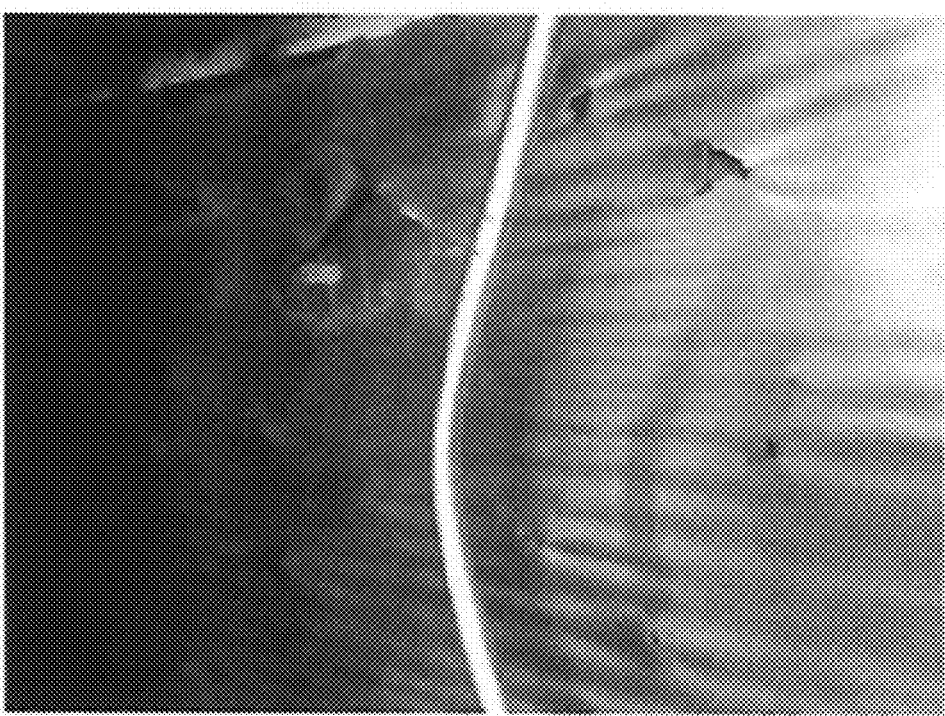
FIG. 5A depicts an image of an anode film prepared with commercially available CMC particles.

In addition to electrochemical performance enhancement, the smaller $D_{50}$ particle size of CMC mitigated electrode defects, such as holes, cracks or surface pits. Dry powder formulations using CMC powder as received from the manufacturer with $D_{50}$ particle size of 70 μm produced electrode free-standing films with defects as observed in FIG. 5. These defects were circumvented using milled CMC with $D_{50}$ particle size of about 10 μm as illustrated in FIG. 6. The rationale for these empirical results lies in the larger surface area offered by the smaller $D_{50}$ CMC particle size. At a fixed binder weight ratio in an electrode formulation, the higher surface area may offer a stronger binding strength to the active material powder matrix and a weaker affinity for the heated rollers used to produce films or used to calender down film thicknesses. In contrast, the larger $D_{50}$ CMC particle size may offer a weaker binding strength to the active materials powder matrix and a stronger affinity to heated rollers used to produce films or used to calender down film thicknesses. This stronger affinity to the heated calender rollers can be attributed to a larger single spot size of the larger $D_{50}$ particle size of CMC binder particles found in unmilled powder, which came into direct contact to the heated calender rollers during dry processing. As such, the larger CMC particles could be incidentally removed from the electrode powder sample during powder-to-film formation or extracted from the film during film-to-film thickness reduction process, leaving behind defects in the electrode. Tensile strength measurements of free-standing electrode films also support the idea that a stronger binding cohesion strength of the finely milled CMC polymer binder. The tensile strength results indicate that electrode films at similar thicknesses produced using CMC binder with a smaller $D_{50}$ particle size (10 μm vs. about 70 μm) were stronger than those produced with larger particle size. Empirical results are presented in Table 1.

TABLE 1

| CMC Type | Median Particle Size | Graphite Film Thickness | Graphite Film Tensile Strength |
|---|---|---|---|
| As received | 73.4 ± 1.6 μm | 300-301 μm | 0.936 N |
| Resodyne processed | 66.0 ± 2.3 μm | 299-301 μm | 1.01 N |
| Jet milled ("Hosokawa") | 10.1 ± 0.8 μm | 298-300 μm | 1.74 N |

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A method of fabricating a dry electrode film of an energy storage device, comprising:
   mixing a dry microparticulate non-fibrillizable binder with a first dry active material by a first nondestructive mixing process to form a dry bulk active material mixture;
   mixing a dry fibrillizable binder with a second dry active material by a high shear mixing process to form a dry structural binder mixture;
   mixing the dry bulk active material mixture and the dry structural binder mixture by a second nondestructive mixing process to form a dry electrode film mixture; and
   producing a free-standing dry electrode film from the dry electrode film mixture.

2. The method of claim 1, further comprising processing a dry non-fibrillizable binder at high shear to form the dry microparticulate non-fibrillizable binder.

3. The method of claim 1, wherein the first and second nondestructive mixing processes are selected from the group consisting of nondestructive jet milling, tumbling, paddle mixing, blade blending, acoustic mixing, and combinations thereof.

4. The method of claim 1, wherein the high shear mixing process is selected from the group consisting of high shear jet milling, blending, and combinations thereof.

5. The method of claim 1, wherein producing the free-standing dry electrode film comprises processing the dry electrode film mixture by a process selected from the group consisting of pressing, calendering, and combinations thereof.

6. The method of claim 5, wherein the producing the free-standing dry electrode film comprises heated calendering the dry electrode film mixture.

7. The method of claim 1, wherein the method is a dry fabrication process.

8. The method of claim 1, wherein the dry microparticulate non-fibrillizable binder comprises a $D_{50}$ particle size of about 0.5-40 μm.

9. The method of claim 1, wherein the free-standing dry electrode film comprises a dry binder, wherein the dry binder comprises the dry fibrillizable binder and up to 50 wt. % of the microparticulate non-fibrillizable binder.

10. The method of claim 1, wherein the dry microparticulate non-fibrillizable binder is selected from at least one of cellulose and a cellulose derivative.

11. The method of claim 1, wherein the dry fibrillizable binder comprises polytetrafluoroethylene (PTFE).

12. The method of claim 1, wherein the free-standing dry electrode film is substantially free of holes, cracks and surface pits.

13. The method of claim 1, wherein the free-standing dry electrode film has a tensile strength of at least about 1 N.

14. The method of claim 1, wherein at least one of the first and second dry active materials comprise graphite.

15. The method of claim 1, wherein the free-standing dry electrode film comprises a thickness of at least about 250 µm.

16. The method of claim 1, wherein the free-standing dry electrode film further comprises an additional non-fibrillizable binder.

17. The method of claim 16, wherein the additional non-fibrillizable binder comprises polyvinylidene fluoride (PVDF).

18. The method of claim 1, wherein the dry electrode film comprises at least about 92 wt. % of the first and second dry active materials.

19. The method of claim 1, further comprising contacting the free-standing dry electrode film of claim 1 with a current collector to form an electrode.

20. The method of claim 19, further comprising inserting the electrode into a housing to form an energy storage device.

21. The method of claim 20, wherein the energy storage device is a battery.

22. The method of claim 20, wherein the energy storage device has a first cycle efficiency of at least about 90%.

* * * * *